(12) United States Patent
Rice et al.

(10) Patent No.: US 6,567,605 B1
(45) Date of Patent: May 20, 2003

(54) FIBER OPTIC PROJECTION DEVICE

(75) Inventors: Robert Rex Rice, Canoga Park, CA (US); Neil F. Ruggieri, St. Louis, MO (US); Mark Steven Zediker, St. Louis, MO (US)

(73) Assignee: The Boeing Company, Seattle, WA (US)

( * ) Notice: Subject to any disclaimer, the term of this patent is extended or adjusted under 35 U.S.C. 154(b) by 159 days.

(21) Appl. No.: 09/648,225

(22) Filed: Aug. 25, 2000

(51) Int. Cl.[7] .................................................. G02B 6/00
(52) U.S. Cl. .............................. 385/147; 372/3; 359/334
(58) Field of Search ............................ 385/147; 353/31, 353/37; 348/760; 372/3, 6, 22, 9; 359/333, 334, 327

(56) References Cited

U.S. PATENT DOCUMENTS

| | | |
|---|---|---|
| 5,255,082 A | 10/1993 | Tamada |
| 5,317,348 A | 5/1994 | Knize |
| 5,517,263 A | 5/1996 | Minich et al. |
| 5,534,950 A | 7/1996 | Hargis et al. |
| 5,614,961 A | 3/1997 | Gibeau et al. |
| 5,694,408 A | 12/1997 | Bott et al. |
| 5,700,076 A | 12/1997 | Minich et al. |
| 5,704,700 A | 1/1998 | Kappel et al. |
| 5,802,222 A | 9/1998 | Rasch et al. |
| 5,818,546 A | 10/1998 | Opower et al. |
| 5,832,006 A | 11/1998 | Rice et al. |
| 5,847,816 A | 12/1998 | Zediker et al. |
| 6,061,170 A | 5/2000 | Rice et al. |

*Primary Examiner*—Euncha Cherry
(74) *Attorney, Agent, or Firm*—Altson & Bird LLP (57) ABSTRACT

A fiber optic projection device is provided that includes red, green and blue fiber optic sources, each of which includes at least one fiber amplifier for emitting an amplified signal of a predetermined wavelength. To provide signals that are scalable to high power levels, each fiber optic source can include a master oscillator, a plurality of fiber amplifiers for amplifying the input signals provided by the master oscillator and a combiner for combining the amplified signals emitted by each of the fiber amplifiers. While the fiber amplifier of each fiber optic source can be a dual core fiber that is appropriately doped, the red fiber optic source can include fiber amplifiers that rely upon Raman gain to provide the desired amplification. The red fiber optic source therefore not only includes a master oscillator, but also includes a red subharmonic oscillator for generating signals having a Raman seed wavelength for amplification by the fiber amplifiers. Each fiber optic source also includes a frequency altering device, such as a frequency doubler, for altering the frequency of the amplified signals to produce a signal having the respective color. The fiber optic projection device also includes at least one modulator for individually modulating the intensity of the signals having the respective colors. For example, the master oscillator can be modulated to control the duty cycle of the emitted signals. Further, the fiber optic projection device can include a projector for mixing the modulated signals having the different colors to create a full color image.

25 Claims, 3 Drawing Sheets

FIBER OPTIC PROJECTION DEVICE

FIELD OF THE INVENTION

The present invention relates generally to laser projectors and, more particularly, to fiber optic projection devices.

BACKGROUND OF THE INVENTION

Video and other types of projectors are required for a wide variety of applications. While a variety of projection devices have been developed, laser projection devices are currently being developed in order to take advantage of the crisp, bright images exhibiting high color saturation that are provided by laser illumination. In the defense industry, for example, laser projectors can be utilized to create images for use in command centers, electronic cinemas, flight simulators and virtual sand tables in which an image of some portion of the terrain is created.

A typical laser projector includes a red laser, a green laser and a blue laser for emitting red, green and blue light, respectively. A laser projector also includes an opto-mechanical or acousto-optical scanning system for imaging the red, green and blue light onto a screen or other display to thereby produce a full color image.

Various lasers have been utilized in the past to generate the red, green and blue light. For example, laser sources have included visible ion lasers, frequency doubled solid state micro-lasers and electron beam pumped semiconductor lasers. Even though laser projectors have been developed with a wide variety of laser sources, each of these laser projectors suffer from at least some limitations. For example, lasers are notoriously inefficient in converting electrical input power to output optical power. As such, at least some of the conventional laser projectors cannot economically be scaled up so as to provide red, green and blue light having relatively high power levels.

In addition, the images created by at least some laser projectors disadvantageously exhibit laser speckle in instances in which the laser sources produce signals insufficient spectral width. In this regard, laser speckle is intrinsic to narrow-band laser sources in which the speckle manifests itself as fine grain intensity fluctuations in the resulting image. The specific distribution of the intensity fluctuations are rearranged in a random fashion whenever the viewer's head moves slightly in a lateral or vertical direction. The visual effects of speckle detract from the quality of the resulting image and reduce the resolution of the resulting image. Thus, high resolution display systems generally desire to minimize, if not eliminate, laser speckle.

The performance of a laser projector is also compromised if the laser sources do not permit the wavelength of the signals emitted by the laser sources to be tuned somewhat in order to adjust the range of hues in the resulting image. In addition the definition of the images projected by a laser projector will be limited if the intensity of the output of the red, green and blue lasers cannot be modulated over relatively wide bandwidths.

While laser projectors having the aforementioned laser sources offer at least some of the features desired of a laser projection system, conventional laser projectors are each limited in one respect or another. Thus, it would be advantageous to provide an improved laser projector that produces crisp, bright images that exhibit high color saturation while addressing each of the other aforementioned features.

SUMMARY OF THE INVENTION

A fiber optic projection device is therefore provided that includes red, green and blue fiber optic sources that efficiently convert an electrical input into optical power by emitting signals having red, green and blue colors, respectively. As such, the fiber optic projection device can generate signals having red, green and blue colors that are scalable to relatively high power levels while avoiding laser speckle. Accordingly, the images generated by the fiber optic projection device of the present invention should be crisp, bright and should exhibit high color saturation.

Each of the red, blue and green fiber optic sources includes at least one fiber amplifier for emitting an amplified signal of a predetermined wavelength. In order to provide signals having red, green and blue colors that are scalable to high power levels, each fiber optic source of one advantageous embodiment includes a plurality of fiber amplifiers and a combiner for combining the amplified signals emitted by each of the plurality of fiber amplifiers. Regardless of the number of fiber amplifiers, each fiber optic source also includes a frequency altering device, such as a frequency doubler, for altering the frequency of the amplified signals to thereby produce a signal having the respective color, such as red, green or blue. The fiber optic projection device of the present invention also generally includes at least one modulator for individually modulating the intensity of the signals having the red, green and blue colors. Further, the fiber optic projection device can include a projector for mixing the modulated signals having the red, green and blue colors in order to create a full color image.

In one embodiment, the fiber amplifiers of the blue fiber optic source are dual core fibers having an inner core comprised of neodymium doped silica. Likewise, the fiber amplifiers of the green fiber optic source can be dual core fibers having an inner core comprised of germanium doped silica that is further doped with either neodymium or ytterbium. In contrast, however, the red fiber optic source of one advantageous embodiment relies upon Raman gain to generate an amplified signal having a red color. Thus, the red fiber optic source of this embodiment includes a master oscillator for generating a first input signal and a red subharmonic oscillator for generating a second input signal having a Raman seed wavelength. The first and second input signals are selected and each fiber amplifier of the red fiber optic source is designed to provide Raman gain for signals having the Raman seed wavelength. For example, each fiber amplifier of the red fiber optic source can include a dual core fiber having an inner core comprised of ytterbium doped silica and further having a number of gratings written along the length thereof. The frequency altering device of the red fiber optic source of this advantageous embodiment therefore alters the frequency of the signals provided by the fiber amplifiers having the Raman seed wavelength to produce signals having the red color.

In one embodiment, the fiber optic projection device includes a plurality of modulators associated with respective fiber optic sources for receiving signals from the respective frequency altering device and for modulating the intensity of the signals. Alternatively, the fiber optic projection device can include a plurality of modulators associated with respective fiber optic sources for receiving signals from the respective fiber amplifiers and for modulating the intensity of the signals prior to delivering the modulated signals to the respective frequency altering device.

In an alternative embodiment, a master oscillator is provided that modulates the intensity of the signals having the red, green and blue colors. In this regard, it is noted that the frequency altering device preferably alters the frequency of the amplified signals that have a wavelength within a predetermined range of wavelengths, while rejecting signals having other wavelengths. Thus, the fiber optic projection device of this embodiment includes a plurality of modulated master oscillators for providing input signals to the fiber amplifiers of the respective fiber optic sources. Each modulated master oscillator includes first and second sources for alternately providing input signals having first and second wavelengths, respectively, to the respective fiber amplifiers. Each modulated master oscillator also includes a coupler for combining the input signals alternately provided by the first and second sources. The first source is preferably selected to provide input signals having the first wavelength that is within the predetermined range of wavelengths such that the frequency altering device alters the frequency of the amplified signals having the first wavelength. Conversely, the second source is preferably selected to provide input signals having the second wavelength that is outside of the predetermined range of wavelengths such that the frequency altering device rejects the amplified signals having the second wavelength.

Accordingly, by having the modulated master oscillator alternately provide input signals having the first and second wavelengths, the signals having the respective color can be modulated. As such, the modulated master oscillator of this advantageous embodiment of the present invention controls the duty cycle of the amplified signals having the first and second wavelengths and therefore controls the duty cycle of the signals emitted by the frequency altering device since the frequency altering device is only responsive to signals having the first wavelength. By alternately providing signals having the first and second wavelengths even though the frequency altering device is only responsive to signals having the first wavelength, however, the modulated master oscillator of this advantageous embodiment maintains relatively high saturation of the fiber amplifiers such that the fiber optic source generates signals having the respective color in a responsive and an efficient manner.

The fiber optic projection device of the present invention can therefore provide crisp, bright images that exhibit high color saturation in an efficient manner. By employing fiber optic sources that can include arrays of fiber amplifiers, the fiber optic projection device can produce signals having red, green and blue colors that are scalable to very high power levels. In addition, while the wavelength of the signals having the red, green and blue colors that are emitted by the fiber optic sources are somewhat tunable in order to adjust the range of hues that can be reproduced, the spectral width of the red, green and blue signals is sufficient to avoid laser speckle. In addition, the fiber optic projection device provides for video modulation of the signals having the red, green and blue colors over a wide bandwidth in order to provide for an image having high definition. Thus, the fiber optic projection device is suitable for a wide variety of applications including large screen projection systems and the like.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
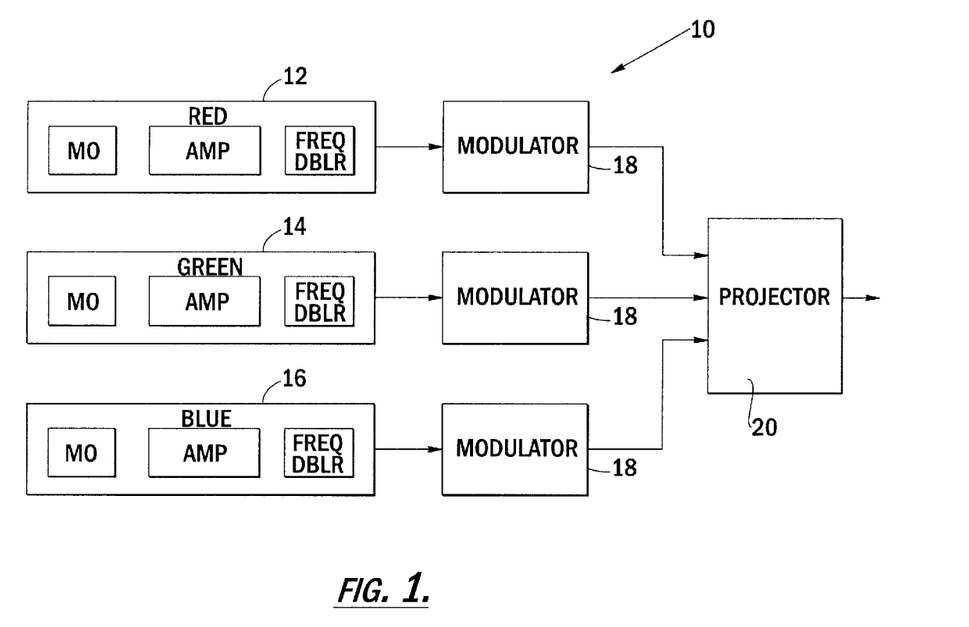
FIG. 1 is a block diagram of a fiber optic projection system of one embodiment of the present invention.

Referring now to FIG. 1, a fiber optic projection device 10 according to one embodiment to the present invention is depicted. As shown, the fiber optic projection device includes red, green and blue fiber optic sources 12, 14, 16 for emitting signals having red, green and blue colors, respectively. In one advantageous embodiment, the red, green and blue fiber optic sources emit signals having wavelengths of 630 nanometers, 530 nanometers and 470 nanometers, respectively. However, the red, green and blue fiber optic sources can be designed to emit signals having slightly different wavelengths in order to adjust the range of hues that can be produced by the fiber optic projection device. In this regard, the wavelength of the signals emitted by the red, green and blue fiber optic sources are generally selected with reference to a chromaticity diagram such that the resulting images will have the desired range of hues.

In addition to the red, green and blue fiber optic sources 12, 14, 16, a fiber optic projection device 10 according to the present invention also includes at least one modulator 18 for modulating the intensity of the signals having the red, green and blue colors. Typically, the fiber optic projection device includes three modulators, one of which is associated with each of the red, green and blue fiber optic sources for individually modulating the intensity of the signals having the red, green and blue colors, respectively. The fiber optic projection device can include several different types of modulators as will be described hereinafter. In one embodiment in which the modulators are downstream of the fiber optic sources so as to receive the amplified signals having the red, green and blue colors, each modulator can be a wideband acoustooptic or electrooptic modulator in order to modulate the intensity of the signals. Regardless of the type of modulator, the modulator can preferably modulate the intensity of the red, green and blue signals over a wide bandwidth, thereby providing for the creation of images having high definition.

The fiber optic projection device 10 also includes a projector 20 for mixing the modulated signals having the red, green and blue colors in order to create a full color image. Typically, the projector is a conventional optomechanical scanning system for imaging the modulated signals having the red, green and blue colors onto a screen, a display or the like. As a result of the individual modulation of the intensity of the signals having the red, green and blue colors, the resulting images created by the projector are in full color with the color depending upon the proportion of the mixed signals that are red, green and blue.

In one embodiment, each fiber optic source includes at least one power amplifier 22 for amplifying an input signal provided by a master oscillator 24. More preferably, however, each fiber optic source includes a phased array of power amplifiers for amplifying a common signal provided by the master oscillator for then coherently combining the amplified signals in order to provide scaleable amplification to relatively high power levels. Although the phased array of power amplifiers will be described in more detail hereinafter, further details of the phased array of power amplifiers are provided by U.S. Pat. No. 5,694,408 to Eric H. Bott et al and U.S. Pat. No. 5,832,006 to Robert R. Rice et al, the contents of both of which are incorporated by reference in their entirety herein.

Figure 2:
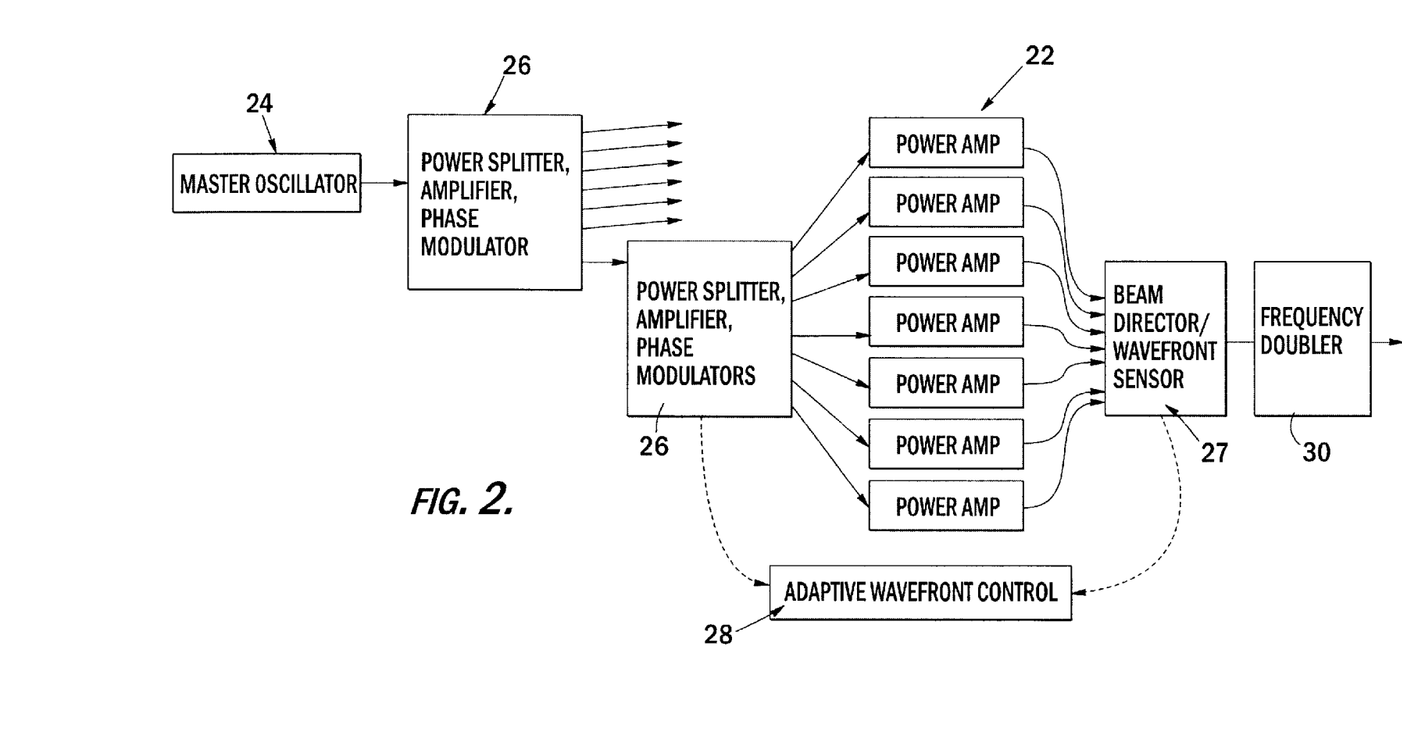
FIG. 2 is a block diagram of a fiber optic source of a fiber optic projection device according to one embodiment of the present invention.

As shown in FIG. 2, each fiber optic source includes a master oscillator 24 for providing an input signal having a predetermined wavelength. A variety of lasers can serve as the master oscillator depending upon the desired wavelength and power level of the input signals. For example, a single mode master oscillator can be a diode pumped fiber laser, a single mode diode laser, a diode pumped mode-locked oscillator or diode pumped rods, slabs or mirrors. The wavelength of the input signals provided by the master oscillator depends upon the color of the resulting signals emitted by the fiber optic source. For the blue fiber optic source 16 designed to emit signals having a wavelength of 470 nanometers, a master oscillator preferably provides input signals having a wavelength of 940 nanometers in order to take into account the subsequent doubling of the frequency of the signals described hereinbelow. Likewise, the master oscillator of the green fiber optic source 14 preferably provides input signals having a wavelength of 1060 nanometers such that the resulting signals emitted by the green fiber optic source will have a wavelength of 530 nanometers following the doubling of the frequency of the signals. The wavelength of the signals provided by the master oscillators can preferably be altered somewhat in order to permit tuning of colors, if so desired. In addition, the signals emitted by each fiber optic source preferably have sufficient spectral width, such as a fraction of 1 nanometer, to avoid laser speckle. While the phased array of power amplifiers depicted in FIG. 2 and described herein can also serve as the red fiber optic source 12, the red fiber optic source preferably relies upon Raman gain for the amplification of the signals as described below in conjunction with FIG. 3. As such, the subsequent discussion of the phase array of power amplifiers as depicted in FIG. 2 will focus on the green and blue fiber optic sources.

For a fiber optic source having a phased array of power amplifiers 22, the input signals provided by the master oscillator 24 are split by a power splitter 26, such as wave guide signal splitter or a signal power splitter, which divides the input signals into a plurality of secondary signals in one embodiment, for example, the power splitter is a passive coupler, such as a 3 dB fiber coupler or a 1:N single mode star coupler, such that the frequency and the wavelength of the secondary signals are not altered. While the input signals can be divided into any number of secondary laser signals, the resulting signals emitted the fiber optic source can have greater power levels by further dividing and amplifying the input signals. Thus, the system designer can optimize or scale the amplification by controlling the number of times that the laser signals are divided.

While each of the secondary laser signals can be amplified and the amplified secondary laser signals then combined into a composite signal in a controlled manner in which the phase of each secondary laser signal is individually controlled, such as by being matched to the phase of other secondary laser signals, each secondary laser signal can be further split into a plurality of tertiary laser signals as depicted in FIG. 2. As before, the tertiary laser signals have a wavelength that is equal to the wavelength of the secondary laser signals and, in turn, the input signals provided by the master oscillator 24. While two cascaded levels of signal division are depicted in FIG. 2, the fiber optic source can include additional levels of division without departing from the spirit and scope of the present invention. As a result of the further division of the signals, the signals are further amplified and the power level of the resulting composite signal emitted by the fiber optic source is increased. Accordingly, the output power provided by the fiber optic source is scaleable and can be selected based upon the requirements of the particular application by controlling the division of the input signals and the amplification of the divided signals.

Following splitting of the signals, the signals are preferably amplified. As depicted in FIG. 2, for example, a power amplifier 22 receives and amplifies each of the tertiary laser signals. Each power amplifier is preferably a fiber amplifier. In this regard, each fiber amplifier is typically a dual core optical fiber that is specifically designed to efficiently amplify signals of a particular wavelength. For the green fiber optic source 14 in which the master oscillator 24 introduces signals having a wavelength of 1060 nanometers, the fiber amplifiers are preferably dual core optical fibers having an inner core formed of germanium doped silica that is further doped with either neodymium or ytterbium in order to preferentially amplify signals having a wavelength of 1060 nanometers. Likewise, the fiber amplifiers of the blue fiber optic source 16 are preferably dual core optical fibers having a neodymium doped silica inner core in order to efficiently amplify signals having a wavelength of 940 nanometers. Although not depicted in FIG. 2, each fiber amplifier is also pumped by a pump source, such as a laser diode array, as described in more detail by U.S. Pat. No. 5,694,408 to Eric H. Bott et al.

Following the amplification, the amplified signals emitted by the fiber amplifiers 22 are combined into a composite output signal having a power level greater than the input signal that was split and provided to each of the individual fiber amplifiers. However, the wavelength of the amplified signals are generally still the same as the wavelength of the input signal provided by the master oscillator 24. As described by U.S. Pat. No. 5,694,408 to Eric H. Bott et al and, in more detail, by U.S. patent application Ser. No. 09/420,391 entitled Apparatus, Method and Computer Program Product for Controlling an Interferrometric Phased Array by Bartley C. Johnson, the contents of which are also incorporated by reference herein, the amplified signals provided by the fiber amplifiers can be combined by a beam combining array 27 having a plurality of lens elements for collimating respective ones of the plurality of amplified signals. As also described by the aforementioned patent and patent application, the fiber optic source also includes a sensor for sampling the amplified signals and/or for sensing the wavefront of the composite signal such that the fiber optic source can adaptively control the wavefront as indicated by the feedback 28 in FIG. 2. For example, the phase of the composite signal can be controllably adjusted by altering the phase of the individual secondary or tertiary laser signal, such as by insuring that the phases of the individual secondary or tertiary laser signals match.

Although not depicted in FIG. 2, the secondary laser signals can also be amplified, such as by an array of fiber amplifiers 22, prior to being split into tertiary laser signals and further amplified, if so desired. While the fiber optic source of FIG. 2 only depicts the amplified tertiary signals that are split from a single secondary laser signal being combined, the fiber optic source separately combines the amplified tertiary laser signals that are split from each secondary laser signal. The fiber optic source then combines each of these combined signals into a single composite signal. As mentioned above, this single composite signal has the same wavelength as the input signals provided by the master oscillator 24, but generally has a much greater power level due to the repeated amplification of the signals.

The fiber optic source also includes a frequency altering device 30 for altering the frequency of the amplified composite signal. Typically, the frequency altering device is a frequency doubler for doubling the frequency of the amplified signals. In this regard, the frequency doubler can be a KTP crystal, periodically poled lithium niobate, periodically poled lithium tantalate or periodically poled rubidium titanylphosphate. For the blue fiber optic source 16, the amplified signals having a wavelength of 940 nanometers can therefore be frequency doubled to have a wavelength of 470 nanometers, thereby exhibiting a blue color. Likewise, the frequency doubler of the green fiber optic source 14 can double the frequency of the amplified signals having a wavelength of 1060 nanometers so as to produce signals having a wavelength of 530 nanometers, thereby exhibiting a green color. Following any necessary modulation, the red, green and blue signals can be appropriately mixed and projected onto a display or the like. Since the divergence of the red, green and blue output signals is quite low, however, the projector 20 can advantageously utilize projection optics having a lower numerical aperture (NA).

Figure 3:
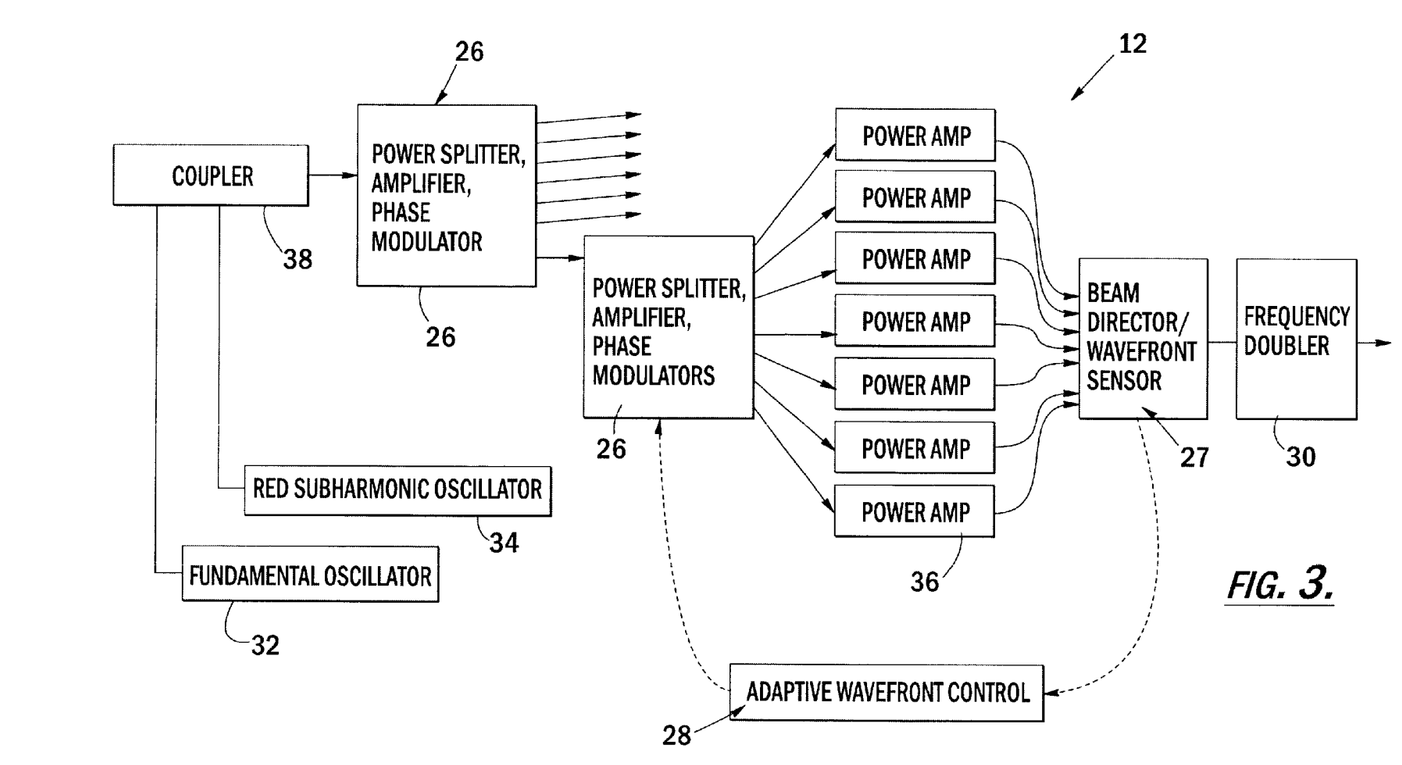
FIG. 3 is a block diagram of a red fiber optic source that relies upon Raman gain to amplify an input signal according one embodiment to the present invention.

While the red fiber optic source 12 can be embodied in the same fashion as the green and blue fiber optic sources 14, 16 depicted in FIG. 2, especially for generating signals having some of the longer wavelengths of red, the red fiber optic source typically relies upon the Raman gain in order to provide the necessary amplification and is therefore preferably configured as depicted in FIG. 3. Many of the components and their operation are identical to the like components of the green and blue fiber optic sources described above in conjunction with FIG. 2 and, as such, will not be further described herein. However, further details regarding a fiber optic source that relies upon Raman gain are provided by U.S. Pat. No. 5,832,006 to Robert R. Rice, et al. As depicted in FIG. 3, the master oscillator is replaced with a pair of oscillators, namely, a fundamental oscillator 32 and a red subharmonic oscillator 34. In operation, the signals emitted by the fundamental oscillator provide pump energy to the power amplifiers 36 in order to pump the Raman process. In contrast, the red subharmonic oscillator provides an input signal having the Raman seed wavelength, that is, the wavelength of the resulting signals that have been amplified by the Raman process. For example, the fundamental oscillator can be a semiconductor laser that provides signals having a wavelength of 1120 nanometers and the red subharmonic oscillator can be another semiconductor laser that provides signals having a wavelength of 1260 nanometers.

The red fiber optic source 12 of FIG. 3 also includes at least one and, more preferably, an array of Raman-shifted power amplifiers 36 as compared to the array of fiber amplifiers as described above in conjunction with FIG. 2. Typically, each Raman-shifted power amplifier is a dual core optical fiber having an inner core formed of ytterbium doped silica. As known to those skilled in the art, the dual core optical fibers also generally include a plurality of gratings spaced along the length thereof for providing the Raman gain. As known to those skilled in the art, Raman-shifted power amplifiers are commercially available from companies such as Lucent Technologies.

In operation, both the fundamental oscillator 32 and the red subharmonic oscillator 34 provide input signals having respective wavelengths, typically 1120 nanometers and 1260 nanometers, respectively. These input signals are combined, such as by a wavelength division multiplexing coupler 38, prior to being split and amplified by the Raman-shifted power amplifiers 36. Following the amplification of the signals, the signals are recombined into a composite signal and the phase of the amplified signals is sampled and adjusted such that the amplified signals have a desired phase relationship, such as by being phase matched. The composite signal can also be filtered so as to eliminate all signals other than those signals having the desired Raman wavelength, such as 1260 nanometers in the present embodiment. As described above, the red fiber optic source can also include a frequency altering device 30 for altering the frequency of the composite signal. Typically, the frequency altering device is a frequency doubler, such as a KTP crystal, periodically poled lithium niobate, periodically poled lithium tantalate or periodically poled rubidium titanylphosphate. As such, the red fiber optic source emits a signal having the wavelength of 630 nanometers, thereby exhibiting a red color.

Regardless of the configuration of the fiber optic source, the intensity of the signals having the red, green and blue colors are individually modulated. As described above, a separate modulator 18 can be associated with each fiber optic source and can be positioned downstream of the frequency altering device 30 in order to modulate the composite signals after the frequency of the signals has been altered, but prior to mixing the signals with signals of other colors for projection onto the screen or the like. In this regard, the modulators can be acoustooptic or electrooptic modulators for providing the necessary intensity modulation. Alternatively, a modulator can be inserted between the beam combining array 26 and the frequency altering device of each fiber optic source. While the modulators of this embodiment could still acoustooptic or electrooptic modulators, the modulators preferably apply quadratic pre-emphasis in order to take into account the quadratic response of the frequency doubling crystal as known to those skilled in the art.

Figure 4:
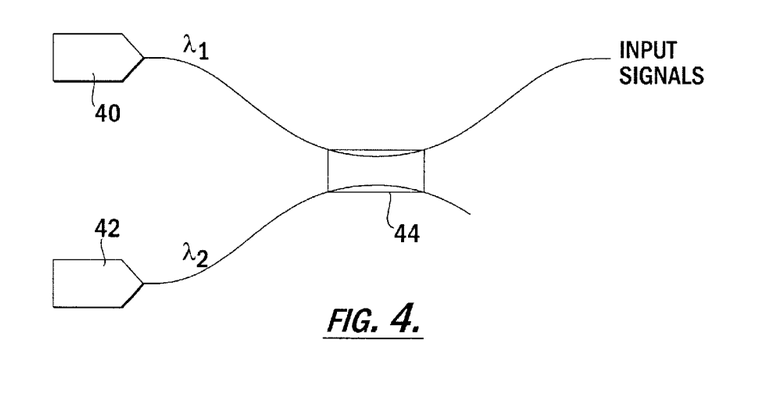
FIG. 4 schematically illustrates a modulated master oscillator of a fiber optic projection device according to one embodiment to the present invention.

According to one advantageous embodiment, however, the modulator is embodied in the master oscillator 24 of each fiber optic source. As depicted in FIG. 4, for example, a modulated master oscillator can be provided that includes first and second sources 40, 42 for providing input signals that have first and second wavelengths, respectively. While the first and second sources can be a variety of different types of lasers, the first and second sources are typically semiconductor lasers. The first and second sources are driven so as to alternately provide input signals having the first and second wavelengths. Thus, the first source could initially provide input signals having the first wavelength while the second source is inactive. Thereafter, the first source could be deactivated while the second source supplies input signals having the second wavelength. This process of alternately driving the first and second sources could be repeated such that the first and second sources alternately provide input signals having the first and second wavelengths, respectively. As also depicted in FIG. 4, the modulated master oscillator includes a coupler 44, such as wavelength division multiplexing coupler, for combining the input signals alternately provided by the first and second sources.

The frequency altering device 30 alters the frequency of the amplified signals that have a wavelength within a predetermined range of wavelengths while rejecting signals having other wavelengths. Thus, the first source is preferably selected to provide input signals having the first wavelength that is within the predetermined range of wavelengths accepted by the frequency altering device. For the green fiber optic source 14, for example, the first source can provide input signals having a wavelength of 1060 nanometers. Likewise, for the blue fiber optic source 16, the first source can provide input signals having a frequency of 940 nanometers. The respective frequency altering devices will therefore accept signals having these wavelengths and alter their frequency, such as by doubling their frequency. Conversely, the second source is selected to provide input signals having the second wavelength that is outside of the predetermined range of wavelengths that the frequency altering device accepts. As such, the frequency altering device will reject the signals having the second wavelength. While the second sources can provide signals having a variety of second wavelengths, the second sources of one embodiment provide signals having a wavelength difference that is typically greater, in a KTP crystal, for example, than ±0.3 nanometers spectral acceptance and which falls outside the range of wavelengths accepted by most frequency doublers.

By alternately providing input signals having first and second wavelengths that are accepted and rejected by the frequency altering device 30, respectively, the modulated master oscillator 24 effectively modulates the output of a fiber optic source. In particular, the modulated master oscillator effectively controls the duty cycle of the input signals having the first wavelength that are accepted by the frequency altering device. By providing input signals having the second wavelength during those periods of time in which the first source is inactive, however, the modulated master oscillator maintains the saturation of the fiber amplifiers 22 such that the fiber optic source is more responsive and operates more efficiently than a fiber optic source that is not pumped during periods of inactivity. Moreover, the modulated master oscillator permits the intensity of the resulting composite signal to be modulated over a wide bandwidth, thereby providing for the subsequent projection of images having high definition.

The fiber optic projection device 10 of the present invention can therefore provide crisp, bright images that exhibit high color saturation in an efficient manner. By employing fiber optic sources that can include arrays of fiber amplifiers, the fiber optic projection device can produce signals having red, green and blue colors that are scalable to very high power levels. In addition, while the wavelength of the signals having the red, green and blue colors that are emitted by the fiber optic sources are somewhat tunable in order to adjust the range of hues that can be reproduced, the spectral width of the red, green and blue signals is sufficient to avoid laser speckle. In addition, the fiber optic projection device provides for video modulation of the signals having the red, green and blue colors over a wide bandwidth in order to provide for an image having high definition. Thus, the fiber optic projection device is suitable for a wide variety of applications including large screen projection systems and the like.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fiber optic projection device comprising:

red, blue and green fiber optic sources for emitting signals having red, green and blue colors, respectively, each fiber optic source comprising:
      at least one fiber amplifier for emitting an amplified signal of a predetermined wavelength; and
      a frequency altering device for altering the frequency of the amplified signal to thereby produce a signal having the respective color,
      wherein said red fiber optic source further comprises a red subharmonic oscillator for providing an input signal having a Raman seed wavelength to said at least one fiber amplifier which, in turn, provides Raman gain to the input signal having the Raman seed wavelength, and wherein the respective fiber amplifiers of said blue and green fiber optic sources emit amplified signals of the predetermined wavelength in a manner independent of Raman gain;

at least one modulator for individually modulating the intensity of the signals having the red, green and blue colors; and a projector for mixing the modulated signals having the red, green and blue colors in order to create a color image.

2. A fiber optic projection device according to claim 1 wherein said frequency altering device alters the frequency of the amplified signals that have a wavelength within a predetermined range of wavelengths to thereby produce signals having the respective color, and wherein said at least one modulator comprises a plurality of modulated master oscillators for providing input signals to said at least one fiber amplifier of a respective one of said red, blue and green fiber optic sources, each modulated master oscillator comprising:

first and second sources for alternately providing input signals having first and second wavelengths, respectively, to said at least one fiber amplifier; and a coupler for combining the input signals alternately provided by said first and second sources, wherein said first source is selected to provide input signals having the first wavelength that is within the predetermined range of wavelengths such that said frequency altering device alters the frequency of the amplified signals having the first wavelength, and wherein said second source is selected to provide input signals having the second wavelength that is outside of the predetermined range of wavelengths such that said frequency altering device fails to alter the frequency of the amplified signals having the second wavelength, to thereby permit the signals having the respective color to be modulated by alternately providing input signals having the first and second wavelengths.

3. A fiber optic projection device according to claim 1 wherein said at least one modulator comprises a plurality of modulators associated with respective ones of said fiber optic sources for receiving signals from said respective frequency altering device and for modulating the intensity of the signals.

4. A fiber optic projection device according to claim 1 wherein said at least one modulator comprises a plurality of modulators associated with respective ones of said fiber optic sources for receiving signals from said respective at least one fiber amplifier and for modulating the intensity of the signals prior to delivering the modulated signals to the respective frequency altering device.

5. A fiber optic projection device according to claim 1 wherein said at least one fiber amplifier of said blue fiber optic source comprises a dual core fiber having an inner core comprised of neodynium doped silica.

6. A fiber optic projection device according to claim 1 wherein said at least one fiber amplifier of said green fiber optic source comprises a dual core fiber having an inner core comprised of germanium doped silica that is further doped with at least one of neodynium and ytterbium.

7. A fiber optic projection device according to claim 1 wherein said at least one fiber amplifier of each fiber optic source comprises a plurality of fiber amplifiers, and wherein each fiber optic source further comprises a combiner for combining the amplified signals emitted by each of said plurality of fiber amplifiers.

8. A fiber optic projection device according to claim 1 wherein said frequency altering device of each fiber optic source comprises a frequency doubler.

9. A fiber optic projection device comprising:
blue and green fiber optic sources for emitting signals having blue and green colors, respectively, said blue and green fiber optic sources each comprising:
a master oscillator for generating an input signal of a predetermined wavelength;
at least one fiber amplifier for amplifying the input signal and for emitting the amplified signal having the predetermined wavelength; and
a frequency altering device for altering the frequency of the amplified signal to thereby produce a signal having the respective color;
a red fiber optic source for emitting signals having a red color, said red fiber optic source comprising:
a master oscillator for generating a first input signal;
a red subharmonic oscillator for generating a second input signal having a Raman seed wavelength;
at least one fiber amplifier for providing Raman gain to the second input signal having the Raman seed wavelength; and
a frequency altering device for altering the frequency of the signal provided by said at least one fiber amplifier having the Raman seed wavelength to thereby produce a signal having the red color; and
a projector for mixing the signals having the different respective colors in order to create a color image.

10. A fiber optic projection device according to claim 9 further comprising at least one modulator for individually modulating the intensity of the signals having the red, green and blue colors.

11. A fiber optic projection device according to claim 10 wherein said frequency altering device alters the frequency of the amplified signals that have a wavelength within a predetermined range of wavelengths to thereby produce signals having the respective color, and wherein said at least one modulator comprises a plurality of modulated master oscillators for providing input signals to said at least one fiber amplifier of a respective one of said red, blue and green fiber optic sources, each modulated master oscillator comprising:
first and second sources for alternately providing input signals having first and second wavelengths, respectively, to said at least one fiber amplifier; and
a coupler for combining the input signals alternately provided by said first and second sources,
wherein said first source is selected to provide input signals having the first wavelength that is within the predetermined range of wavelengths such that said frequency altering device alters the frequency of the amplified signals having the first wavelength, and wherein said second source is selected to provide input signals having the second wavelength that is outside of the predetermined range of wavelengths such that said frequency altering device fails to alter the frequency of the amplified signals having the second wavelength, to thereby permit the signals having the respective color to be modulated by alternately providing input signals having the first and second wavelengths.

12. A fiber optic projection device according to claim 10 wherein said at least one modulator comprises a plurality of modulators associated with respective ones of said fiber optic sources for receiving signals from said respective frequency altering device and for modulating the intensity of the signals.

13. A fiber optic projection device according to claim 10 wherein said at least one modulator comprises a plurality of modulators associated with respective ones of said fiber optic sources for receiving signals from said respective at least one fiber amplifier and for modulating the intensity of the signals prior to delivering the modulated signals to the respective frequency altering device.

14. A fiber optic projection device according to claim 9 wherein said at least one fiber amplifier of said red fiber optic source comprises a dual core fiber having an inner core comprised of ytterbuim doped silica.

15. A fiber optic projection device according to claim 9 wherein said at least one fiber amplifier of said blue fiber optic source comprises a dual core fiber having an inner core comprised of neodynium doped silica.

16. A fiber optic projection device according to claim 9 wherein said at least one fiber amplifier of said green fiber optic source comprises a dual core fiber having an inner core comprised of germanium doped silica that is further doped with at least one of neodynium and ytterbium.

17. A fiber optic projection device according to claim 9 wherein said at least one fiber amplifier of each fiber optic source comprises a plurality of fiber amplifiers, and wherein each fiber optic source further comprises a combiner for combining the amplified signals emitted by each of said plurality of fiber amplifiers.

18. A fiber optic projection device according to claim 9 wherein said frequency altering device of each fiber optic source comprises a frequency doubler.

19. A fiber optic projection device comprising:
at least one fiber optic source for emitting signals having a predetermined color, said at least one fiber optic source comprising:
at least one fiber amplifier for receiving input signals and for amplifying the input signals; and
a frequency altering device for altering the frequency of the amplified signals that have a wavelength within a predetermined range of wavelengths to thereby produce signals having the predetermined color; and
a modulated master oscillator for providing the input signals to said at least one fiber amplifier, said modulated master oscillator comprising:
first and second sources for alternately providing input signals having first and second wavelengths, respectively, to said at least one fiber amplifier; and
a coupler for combining the input signals alternately provided by said first and second sources,
wherein said first source is selected to provide input signals having the first wavelength that is within the predetermined range of wavelengths such that said frequency altering device alters the frequency of the amplified signals having the first wavelength, and wherein said second source is selected to provide input signals having the second wavelength that is outside of the predetermined range of wavelengths such that said frequency altering device fails to alter the frequency of the amplified signals having the second wavelength, to thereby permit the signals having the predetermined color to be modulated by alternately providing input signals having the first and second wavelengths.

20. A fiber optic projection device according to claim 19 wherein said at least one fiber optic source comprises red, blue and green fiber optic sources.

21. A fiber optic projection device according to claim 20 wherein said at least one fiber amplifier of said blue fiber optic source comprises a dual core fiber having an inner core comprised of neodynium doped silica.

22. A fiber optic projection device according to claim 20 wherein said at least one fiber amplifier of said green fiber optic source comprises a dual core fiber having an inner core comprised of germanium doped silica that is further doped with at least one of neodynium and ytterbium.

23. A fiber optic projection device according to claim 20 wherein said red fiber optic source further comprises a red subharmonic oscillator for providing an input signal having a Raman seed wavelength to said at least one fiber amplifier, and wherein said at least one fiber amplifier provides Raman gain to the input signal having the Raman seed wavelength.

24. A fiber optic projection device according to claim 19 wherein said at least one fiber amplifier of each fiber optic source comprises a plurality of fiber amplifiers, and wherein each fiber optic source further comprises a combiner for combining the amplified signals emitted by each of said plurality of fiber amplifiers.

25. A fiber optic projection device according to claim 19 wherein said frequency altering device of each fiber optic source comprises a frequency doubler.

* * * * *